J. T. DARNELL.
Kettle-Bail.
No. 132,450.                               Patented Oct. 22, 1872.
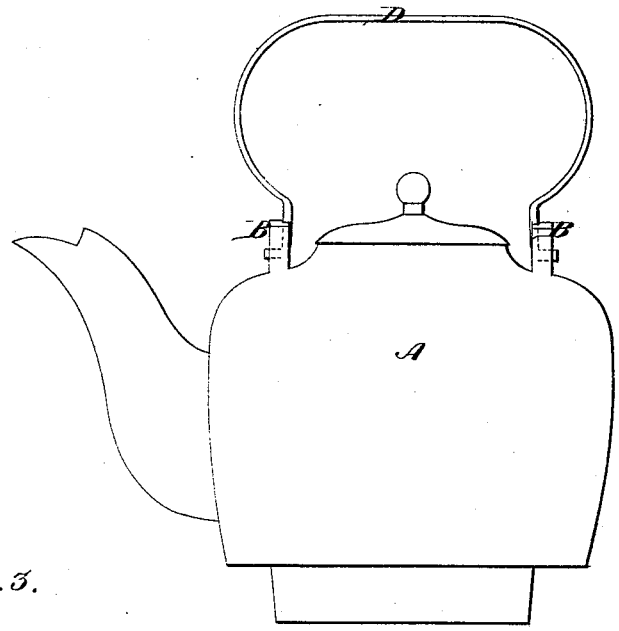
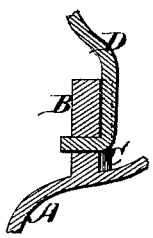
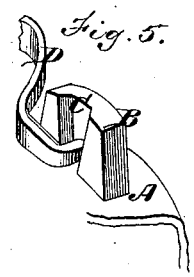
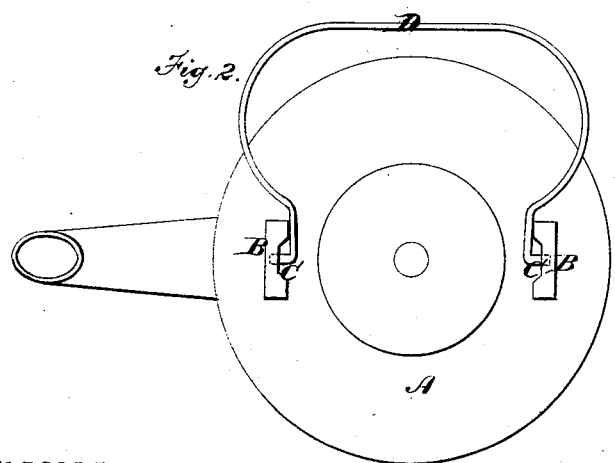
Witnesses.                                        Inventor
C. F. Brown                                       John T. Darnell,
N. K. Ellsworth                                   By his Attys.
                                                  Hill & Ellsworth.

UNITED STATES PATENT OFFICE.

JOHN T. DARNELL, OF FLORENCE, NEW JERSEY.

IMPROVEMENT IN KETTLE-BAILS.

Specification forming part of Letters Patent No. 132,450, dated October 22, 1872.

*To all whom it may concern:*

Be it known that I, JOHN T. DARNELL, of Florence, in the county of Burlington and State of New Jersey, have invented a new and useful Improvement in the Method of Attaching Bails to Tea and other Kettles; and I do hereby declare the following to be a full, clear, and exact description of the same, reference being had to the accompanying drawing forming part of this specification, in which—

Figure 1 is a side elevation of a tea-kettle, showing my improvement; Fig. 2 is a top-plan view of the same; Figs. 3 and 4 are sectional views, showing the connection of the bail with the lugs or ears of the kettle; and Fig. 5 is a perspective view, showing the same features.

Similar letters of reference in the accompanying drawing denote the same parts.

By the usual method of attachment, the bail or handle of a tea or other kettle swings down and rests upon the breast, and in this position becomes heated to such an extent by the stove that it cannot be handled without a cloth or other holder.

My invention is designed to overcome this difficulty and keep the bail at all times so cool that it can be grasped with the hand without danger of burning. To this end the invention consists in making the bail elastic, and in providing the ears of the kettle with notches or recesses, so that when the bail is turned up its ends shall spring into the recesses to hold it in an upright position, where it cannot be heated by the stove nor by the heat radiated from the side of the kettle. The only heat to which it can be subjected when in this position is that given off by the steam or vapor escaping from the mouth of the kettle, which in no case will be sufficient to prevent it from being handled.

In the accompanying drawing, A is a tea-kettle, having ears B cast upon or otherwise attached to it, which are provided with vertical notches or recesses C in their proximate faces. D is the bail, fitted into the ears in the usual manner. It is composed of metal having some elasticity, so that when swung upward its sides shall spring into the recesses in the ears to hold it in an upright position, as shown in Figs. 1 and 3.

When the kettle is to be set aside the bail can be swung down out of the way, as shown in Figs. 2 and 5.

The sides of the recesses are beveled somewhat to permit the easy movements of the bail in being turned to either position.

If desired, the recesses may be formed in the outer faces of the ears; and I do not, therefore, confine myself to the precise location shown. Neither do I confine myself to the number of ears described, as one or more may be used, according to circumstances.

My invention is applicable not only to tea-kettles, but to pots and other heating-vessels in which bails are employed.

Having thus described my invention, what I claim is—

1. The bail of a tea-kettle or other heating-vessel adapted to be held in an upright position by springing into recessed ears cast upon or otherwise formed upon the kettle, substantially as described, for the purpose specified.

2. In combination with a tea-kettle or other heating-vessel, I claim the recessed ears B and the spring bail D, substantially as described, for the purpose specified.

JOHN T. DARNELL.

Witnesses:
E. A. ELLSWORTH,
N. K. ELLSWORTH.